US009528468B2

(12) United States Patent
Tanaka et al.

(10) Patent No.: US 9,528,468 B2
(45) Date of Patent: Dec. 27, 2016

(54) NOISE REDUCTION SYSTEM

(75) Inventors: Nozomi Tanaka, Tokyo (JP); Shinya Kusuda, Tokyo (JP); Tsutomu Oishi, Tokyo (JP); Yoshinori Oba, Tokyo (JP)

(73) Assignee: IHI CORPORATION (JP)

( * ) Notice: Subject to any disclaimer, the term of this patent is extended or adjusted under 35 U.S.C. 154(b) by 1129 days.

(21) Appl. No.: 13/504,195

(22) PCT Filed: Oct. 26, 2010

(86) PCT No.: PCT/JP2010/068936
§ 371 (c)(1),
(2), (4) Date: May 31, 2012

(87) PCT Pub. No.: WO2011/052566
PCT Pub. Date: May 5, 2011

(65) Prior Publication Data
US 2012/0240587 A1   Sep. 27, 2012

(30) Foreign Application Priority Data

Oct. 28, 2009   (JP) .................. 2009-247779

(51) Int. Cl.
*F02C 1/00* (2006.01)
*F02K 1/34* (2006.01)
(Continued)

(52) U.S. Cl.
CPC . *F02K 1/34* (2013.01); *F02C 6/08* (2013.01); *F02K 1/38* (2013.01); *F02K 1/44* (2013.01);
(Continued)

(58) Field of Classification Search
CPC ................ F02K 1/28; F02K 1/30; F02K 1/32; F02K 1/34; F02K 9/82; F42B 10/668; F01N 1/08; F01N 1/14
(Continued)

(56) References Cited

U.S. PATENT DOCUMENTS 2,826,895 A * 3/1958 English ............... F01D 9/065
60/266
2,990,905 A   7/1961 Lilley .......................... 181/43
(Continued)

FOREIGN PATENT DOCUMENTS

CN   1637262 A   7/2005
GB   1141784      1/1969
(Continued)

OTHER PUBLICATIONS

European Search Report, dated Mar. 18, 2015, issued in corresponding European Patent Application No. EP 10826698.2. Total 6 pages.
(Continued)

*Primary Examiner* — Gerald L Sung
(74) *Attorney, Agent, or Firm* — Ostrolenk Faber LLP

(57) ABSTRACT

A noise reduction system includes: a microjet ring (16) provided at an exhaust side peripheral edge of a main nozzle of a jet engine, and has a plurality of injection pipes (26) formed in a circumferential direction thereof at regular intervals; and a supply path configured to take part of compressed air in from a flow path in an upstream side of a combustor in the jet engine, and to guide the part of compressed air to the plurality of injection pipes (26), wherein the plurality of injection pipes (26) is configured to inject the part of compressed air to a jet flow.

3 Claims, 7 Drawing Sheets

(51) Int. Cl.
   *F02C 6/08*    (2006.01)
   *F02K 1/38*    (2006.01)
   *F02K 1/44*    (2006.01)
   *F02K 1/46*    (2006.01)
   *F02K 1/52*    (2006.01)
(52) U.S. Cl.
   CPC . *F02K 1/46* (2013.01); *F02K 1/52* (2013.01); *F05D 2220/323* (2013.01); *F05D 2260/96* (2013.01)
(58) Field of Classification Search
   USPC .. 60/770, 226.3, 228, 229, 230; 239/265.17, 19, 23; 181/240, 220, 259
   See application file for complete search history.

(56) References Cited

U.S. PATENT DOCUMENTS

| | | | |
|---|---|---|---|
| 2,998,700 A * | 9/1961 | Chaplin, Jr. | B64C 11/001 239/265.17 |
| 3,216,653 A * | 11/1965 | Le Nabour | B64C 11/001 239/598 |
| 7,246,481 B2 | 7/2007 | Gutmark et al. | 60/204 |
| 2003/0182925 A1* | 10/2003 | Lair | B64D 33/06 60/226.1 |
| 2004/0088967 A1* | 5/2004 | Webster | F02K 1/34 60/204 |
| 2005/0210860 A1* | 9/2005 | Gutmark | F02K 1/34 60/204 |
| 2007/0227119 A1* | 10/2007 | Alkabie | F01D 9/023 60/249 |
| 2008/0078159 A1* | 4/2008 | Thomas | B64D 33/06 60/39.5 |
| 2008/0141656 A1* | 6/2008 | Beutin | F01D 9/065 60/262 |
| 2009/0320487 A1* | 12/2009 | Alkislar | F02K 1/34 60/771 |
| 2010/0065680 A1* | 3/2010 | Huber | F02K 1/34 244/1 N |
| 2011/0027070 A1* | 2/2011 | Huber | F02K 1/34 415/119 |
| 2011/0030341 A1* | 2/2011 | Huber | F02K 1/34 60/264 |
| 2011/0042162 A1* | 2/2011 | Huber | F02K 1/34 181/220 |
| 2012/0186224 A1* | 7/2012 | Huber | B64D 33/06 60/242 |
| 2012/0228054 A1* | 9/2012 | Tanaka | F02C 6/08 181/240 |

FOREIGN PATENT DOCUMENTS

| | | |
|---|---|---|
| JP | 2005-195019 | 7/2005 |
| JP | 2010-518323 | 5/2010 |
| WO | WO 2008/100712 | 8/2008 |
| WO | WO 2009/107646 A1 | 9/2009 |

OTHER PUBLICATIONS

International Search Report and Written Opinion mailed Jan. 25, 2011 in corresponding PCT International Application No. PCT/JP2010/068936.

B. Greska et al., "The Effects of Microjet Injection on an F404 Jet Engine," AIAA 2005-3047, 11th AIAA/CEAS Aeroacoustics Conference (26th AIAA Aeroacoustics Conference), May 23-25, 2005, 23 pages.

Office Action dated Nov. 22, 2013 issued in corresponding Chinese Patent Application No. 201080048444.2 with English translation.

* cited by examiner

NOISE REDUCTION SYSTEM

CROSS-REFERENCE TO RELATED APPLICATIONS

The present application is a 35 U.S.C. §§371 national phase conversion of PCT/JP2010/068936, filed Oct. 26, 2010, which claims priority of Japanese Patent Application No. 2009-247779, filed Oct. 28, 2009, the contents of which are incorporated herein by reference. The PCT International Application was published in the Japanese language.

TECHNICAL FIELD

The present invention relates to a noise reduction system used for a jet engine of an aircraft.

TECHNICAL BACKGROUND

A jet engine of an aircraft includes a fan to take air therein, a compressor to take in and compress part of the air taken by the fan, a combustor to mix compressed air generated by the compressor with fuel and to combust the mixture, and a turbine to drive the fan and the compressor by using combustion gas from the combustor, which are all arranged in sequence.

The compressor, combustor and turbine are installed in a main nozzle as a cylindrical partition, and the fan is placed in the upstream side of the main nozzle. Most of the air taken by the fan flows through a bypass flow path provided between the main nozzle and a casing covering the outer periphery of the main nozzle. The air (a bypass flow) which has flowed through the bypass flow path is exhausted so as to surround the outside of a core flow (a jet flow) of the turbine, and thus joins to the jet flow.

The area where the jet flow and the bypass flow join to each other becomes a noise source, and thus noise occurs. Various arts are disclosed to reduce such noise.

For example, an art is disclosed in which the trailing edge perimeter of the bypass flow path of the casing (an engine nacelle) and the trailing edge perimeter of a jet flow path of the main nozzle are formed as saw-teeth shape, which is called a Chevron a Nozzle. A fluid which flows in the inner periphery side of the main nozzle and a fluid which flows in the outer periphery side thereof are efficiently mixed, and thereby the noise is reduced (e.g., refer to Patent Document 1).

In Patent Document 2, a system and a method are disclosed to reduce exhaust noise of a jet engine nozzle having projections (Chevron). The method disclosed in Patent Document 2 includes steps of generating a first flow of gas by a jet engine, delivering the first flow through a nozzle having a trailing edge perimeter that includes multiple projections extending in the aft direction, and injecting a second flow of a pressurized fluid into the first flow proximate to the projections.

In Patent Document 3, a device is disclosed to reduce exhaust noise of a jet engine by using an oscillating jet.

In addition, an art is disclosed in which a plurality of pipes that communicate with a fan section or the compressor is installed around the main nozzle, and the tip of each of the pipes is configured as a nozzle to inject part of compressed air (e.g., refer to Non-Patent Document 1). The nozzle configured in this way injects a microjet to the confluence of the jet flow and the bypass flow. According to this, the jet flow and the bypass flow are properly mixed by the swirl generated by the microjet, and noise can be reduced further.

DOCUMENTS OF THE CONVENTIONAL ART

Patent Documents

[Patent Document 1] U.S. Pat. No. 7,246,481
[Patent Document 2] Published Japanese Translation No. 2010-518323 of the PCT International Publication
[Patent Document 3] Japanese Patent Application, First Publication No. 2005-195019

Non-Patent Documents

[Non-Patent Document 1] Brenton Greska, other four people, The Effects of Microjet Injection On an F404 Jet Engine, AIAA2005-3047, 11th AIAA/CEAS Aeroacoustics Conference (26th AIAA Aeroacoustics Conference), 23-25 May 2005

DISCLOSURE OF THE INVENTION

Problems to be Solved by the Invention

However, in Patent Document 1 described above, a velocity difference is caused by the Chevron Nozzle, and thus a pressure loss occurs. The same situation as this is also disclosed in Patent Document 2. Even if the exhaust noise of the jet engine is reduced by injecting the second flow of the pressurized fluid into the first flow proximate to the projections, the pressure loss still occurs because this art is applied to a jet engine having the Chevron Nozzle.

In Patent Document 3, a channel which guides an oscillating flow so as to flow out toward engine exhaust gas is configured as a thin pipe. Accordingly, a pressure loss in the thin channel is large, and it is practically difficult to supply the oscillating flow enough to effectively reduce engine exhaust noise. In addition, additional devices, a flow control valve, a flow stabilizer and the like, have to be attached to the channel which guides the oscillating flow. Accordingly, the number of components which compose a system increases, the structure of the system becomes complicated, and assembling workability deteriorates.

In addition, regarding the microjet described in Non-Patent Document 1, there is a possibility that the pipe which guides the compressed air expands by heat of the jet engine and thus is damaged.

Further, fluid noise occurs because a cavity flow occurs around the pipe, or additional noise occurs in response to vibration of the pipe.

There is a possibility that an injection angle of the nozzle is changed by microjet injection thrust and a predetermined noise reduction effect is not obtained. Accordingly, a stay or the like to fix the nozzle is necessary in order to maintain the injection angle of the nozzle as a desired angle. Accordingly, the main nozzle is enlarged, a nacelle loss increases in response to the enlargement of the main nozzle, and thereby additional noise occurs.

In addition, high precision is necessary for assembling operations to fix each nozzle in a desired injection angle, and it is difficult to obtain a desired noise reduction effect.

The present invention was conceived in view of the above-described circumstances, and provides a noise reduction system that can prevent damage to a nozzle and efficiently reduce noise.

In addition, the invention provides a noise reduction system that can improve assembling workability thereof and surely obtain a noise reduction effect.

Means for Solving the Problem

A noise reduction system of the first aspect of the present invention is characterized by including: a microjet ring provided at an exhaust side peripheral edge of a main nozzle of a jet engine, and which has a plurality of injection pipes formed in a circumferential direction thereof at regular intervals; and a supply path configured to take part of compressed air in from a flow path in an upstream side of a combustor in the jet engine, and to guide the part of compressed air to the plurality of injection pipes, wherein the plurality of injection pipes is configured to inject the part of compressed air to a jet flow exhausted from the main nozzle.

By configuring as above, without using a conventional nozzle having pipes, a microjet can be injected to the confluence of the jet flow and a bypass flow by using the plurality of injection pipes formed in the microjet ring. Consequently, the rigidity of the portion where the microjet is injected can be further increased compared with a nozzle having pipes, and the injection angle of the injection pipe is not changed even due to the microjet injection thrust. Therefore, miniaturization of the main nozzle can be achieved, damage to the microjet ring can be prevented, the injection angle can be easily maintained, and noise can be efficiently reduced.

In addition, the diameter of the injection pipe can be set larger in response to increasing the rigidity, and thereby the pressure loss can be reduced. Therefore, the microjet-injection can be more efficiently performed, and the noise can be effectively reduced.

Further, because a pipe is not provided at the portion where the microjet is injected, the occurrence of a cavity in an outside flow can be prevented, and thus the occurrence of additional noise can be suppressed.

Moreover, the microjet-injection can be performed by only attaching the microjet ring to the exhaust side peripheral edge of the main nozzle. Therefore, the assembling workability thereof can be improved.

A noise reduction system of the second aspect of the present invention is characterized in that the microjet ring is formed so as to be gradually reduced in diameter from an upstream side toward a downstream side of the jet flow, and an arc surface is formed to the whole periphery of an exhaust side peripheral edge of the microjet ring so that an inner peripheral surface of the microjet ring is increased in diameter toward a tip thereof.

By configuring like the above, the starting point of the arc surface of the microjet ring, that is, the edge in the upstream side of the arc surface, can be set as a throat (the point where the inner diameter of the main nozzle is the smallest) of the main nozzle. Therefore, the microjet-injection can be performed just after the jet flow passed by the throat.

On the other hand, if the microjet-injection is performed before the jet flow passes by the throat, the flow volume of the microjet-injection is difficult to be secured because the pressure inside the main nozzle is so high. Further, if the flow volume by the microjet-injection is added before passing by the throat, the set flow volume of an engine calculated at the throat is changed. Therefore, according to the present invention, it is possible to inject the microjet-injection to an efficient position, and the noise can be more effectively reduced.

A noise reduction system of the present invention is characterized in that at least the vicinity of an injection outlet side in the plurality of injection pipes is formed toward a downstream side thereof so that an acute angle is formed between the vicinity and an axial direction of the main nozzle.

By configuring like this, it is possible to gradually reduce the thickness of at least the vicinity of the injection outlet side in the microjet ring in thickness toward the tip thereof. Therefore, the nacelle resistance of the jet engine can be reduced, and thus it is possible to improve the aerodynamic performance of the jet engine.

A noise reduction system of the present invention is characterized in that a chamber is provided between the microjet ring and the flow path, and configured to communicate the microjet ring to the flow path.

By configuring like this, a large path space for compressed air which flows from the flow path to the microjet ring can be secured. Therefore, the pressure loss can be reduced, and it is possible to more efficiently inject the microjet from each of the injection pipes.

Further, by installing the chamber, the outer surface of the main nozzle in the portion which corresponds to the chamber can be smoothly formed. Therefore, a cavity flow can be more reliably prevented, and nacelle resistance of the jet engine can be reduced.

Effects of the Invention

According to the present invention, without using the conventional nozzle having pipes, the microjet can be injected to the confluence of the jet flow and the bypass flow by using the plurality of injection pipes which was formed in the microjet ring. Consequently, the rigidity of the portion where the microjet is injected can be more increased than using the nozzle having pipes, and the injection angle of the injection pipe is not changed even by the microjet injection thrust. Therefore, the miniaturization of the main nozzle can be achieved, the damage to the microjet ring can be prevented, the injection angle can be easily maintained, and the noise can be efficiently reduced.

In addition, the diameter of the injection pipe can be set larger in response to increasing the rigidity, and thereby the pressure loss can be reduced. Therefore, the microjet-injection can be more efficiently performed, and the noise can be effectively reduced.

Further, because a pipe is not provided at the portion where the microjet is injected, the cavity flow therein can be prevented and thus the occurrence of the additional noise can be suppressed.

Moreover, the microjet-injection can be performed by only attaching the microjet ring to the exhaust side peripheral edge of the main nozzle. Therefore, assembling operations to fix each nozzle in a desired injection angle are unnecessary, and thus the assembling workability thereof can be improved.

EMBODIMENTS FOR IMPLEMENTING THE INVENTION (A Jet Engine)

An embodiment of the present invention is explained based on drawings as follows.

Figure 1:
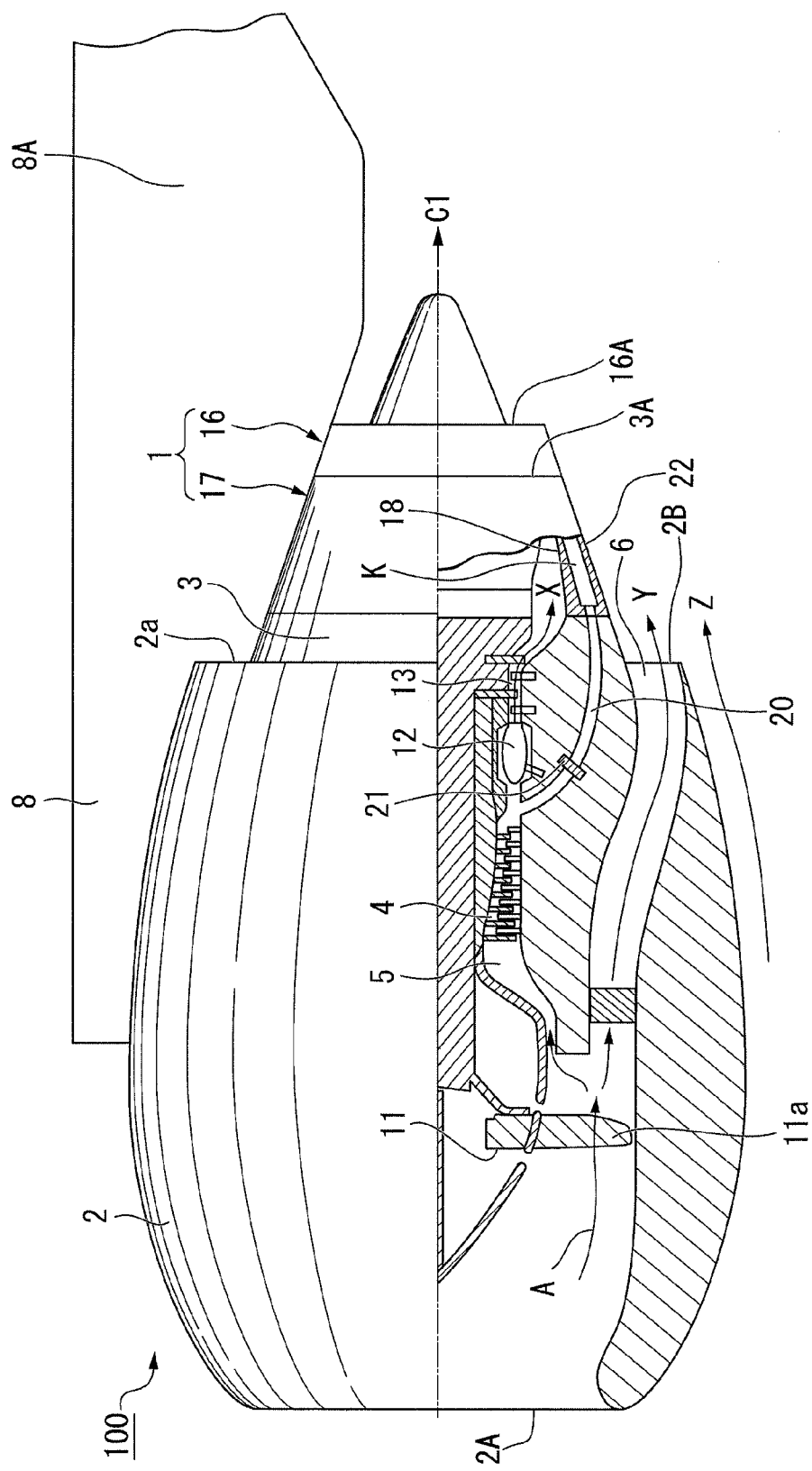
FIG. 1 is a schematic cross-sectional drawing showing the outline structure of a jet engine in an embodiment of the present invention.

FIG. 1 is a schematic cross-sectional drawing showing the outline structure of a jet engine 100 to which a noise reduction system 1 of the present invention is applied.

As shown in FIG. 1, the jet engine 100 includes a cylindrical casing 2, a cylindrical partition 3 inserted in the casing 2 so that a portion of the cylindrical partition 3 protrudes from an exhaust side peripheral edge (a trailing edge) 2a of the casing 2, a fan section 11, a compressor 4, a combustor 12, and a turbine 13. The fan section 11, the compressor 4, the combustor 12, and the turbine 13 are arranged inside the casing 2 in sequence from an upstream side to a downstream side along a central axis C1. In addition, the noise reduction system 1 is provided in the exhaust side (the right side in FIG. 1) of the cylindrical partition 3 in the jet engine 100.

The inside of the cylindrical partition 3 is configured as a flow path 5 through which a high velocity jet flow X flows. A space between the cylindrical partition 3 and the casing 2 is configured as a flow path 6 through which a low velocity bypass flow Y flows.

The casing 2 and the cylindrical partition 3 in the jet engine 100 have the function as an engine nacelle forming the external shape of the jet engine 100. The casing 2 covers a portion of the outer periphery of the cylindrical partition 3.

An opening of the casing 2 in the upstream side functions as an air inlet 2A to take air A therein. On the other hand, an opening of the casing 2 in the downstream side functions as a bypass flow outlet 2B to exhaust the bypass flow Y.

The bypass flow Y is air which was not taken in the compressor 4 among the air A taken in from the air inlet 2A, and is a low velocity fluid which flows between the cylindrical partition 3 and the casing 2. The jet flow X is a fluid exhausted from the turbine 13 and then flows inside the cylindrical partition 3. The jet flow X is a higher velocity fluid than the bypass flow Y. In the outside of the casing 2, an external air flow Z flows along an outer peripheral surface of the casing 2. In other words, the external air flow Z is a low velocity fluid which flows in the outside of the bypass flow Y.

The cylindrical partition 3 is placed so as to be slightly displaced toward the downstream side relative to the casing 2 along the central axis C1. The cylindrical partition 3 separates the flow path 5 through which the jet flow X flows, from the flow path 6 through which the bypass flow Y flows.

A fan 11a is installed in the vicinity of the upstream edge inside the casing 2 and in the upstream side of the cylindrical partition 3. The fan 11a takes the air A therein from the outside.

The compressor 4 is installed in the downstream side of the fan 11a inside the cylindrical partition 3. The compressor 4 takes in and compresses part of the air A taken by the fan 11a.

The combustor 12 is installed in the downstream side of the compressor 4 inside the cylindrical partition 3. The combustor 12 mixes fuel into the air A compressed by the compressor 4, combusts the mixture, and exhausts combustion gas.

The turbine 13 is installed in the downstream side of the combustor 12 inside the cylindrical partition 3. The turbine 13 drives the fan 11a and the compressor 4 by using the combustion gas exhausted from the combustor 12.

The casing 2 and the cylindrical partition 3 of the jet engine 100 configured like this are suspended from a wing of an aircraft (not shown), by using a pylon 8 extending toward the downstream side of the jet flow X and the bypass flow Y.

The pylon 8 includes a projecting portion 8A extending toward the downstream side of the casing 2, and the projecting portion 8A extends in the orthogonal direction to the central axis C1 of the casing 2 and the cylindrical partition 3.

The cylindrical partition 3 functions as a main nozzle to exhaust the jet flow X. A microjet ring 16 is provided at an exhaust side peripheral edge (a trailing edge) 3A of the cylindrical partition 3, and the microjet ring 16 is configured as a part of the noise reduction system 1. In other words, an opening of the microjet ring 16 in the downstream side functions as a jet flow outlet 16A to exhaust the jet flow X.

(A Noise Reduction System)

Figure 2:
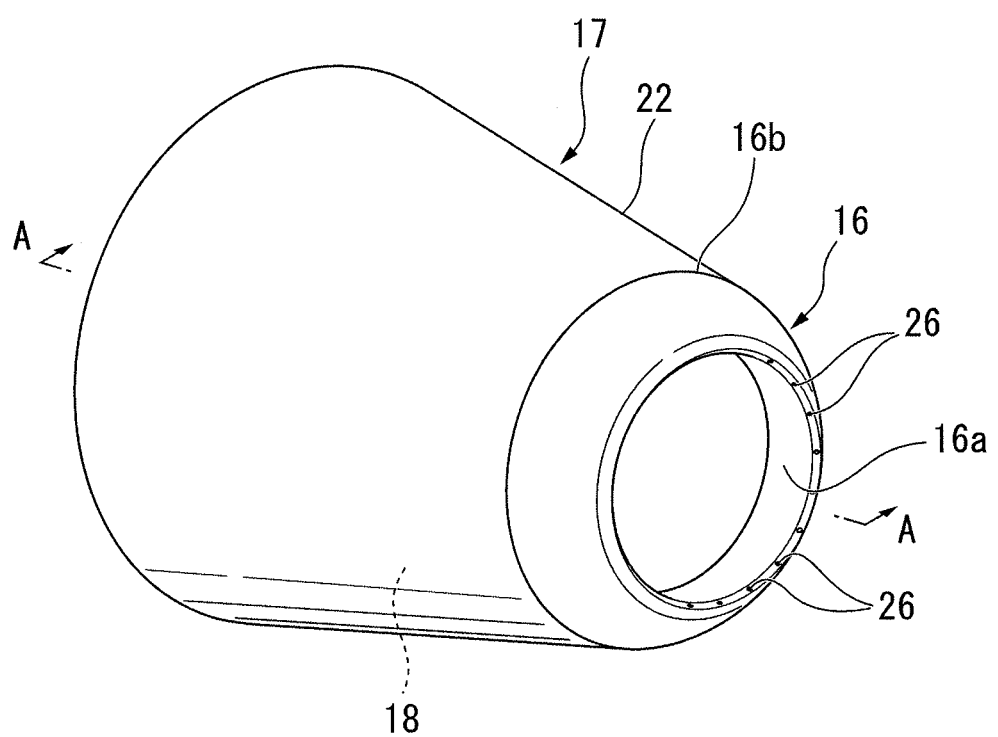
FIG. 2 is a perspective drawing of a noise reduction system in the embodiment of the present invention.
Figure 3:
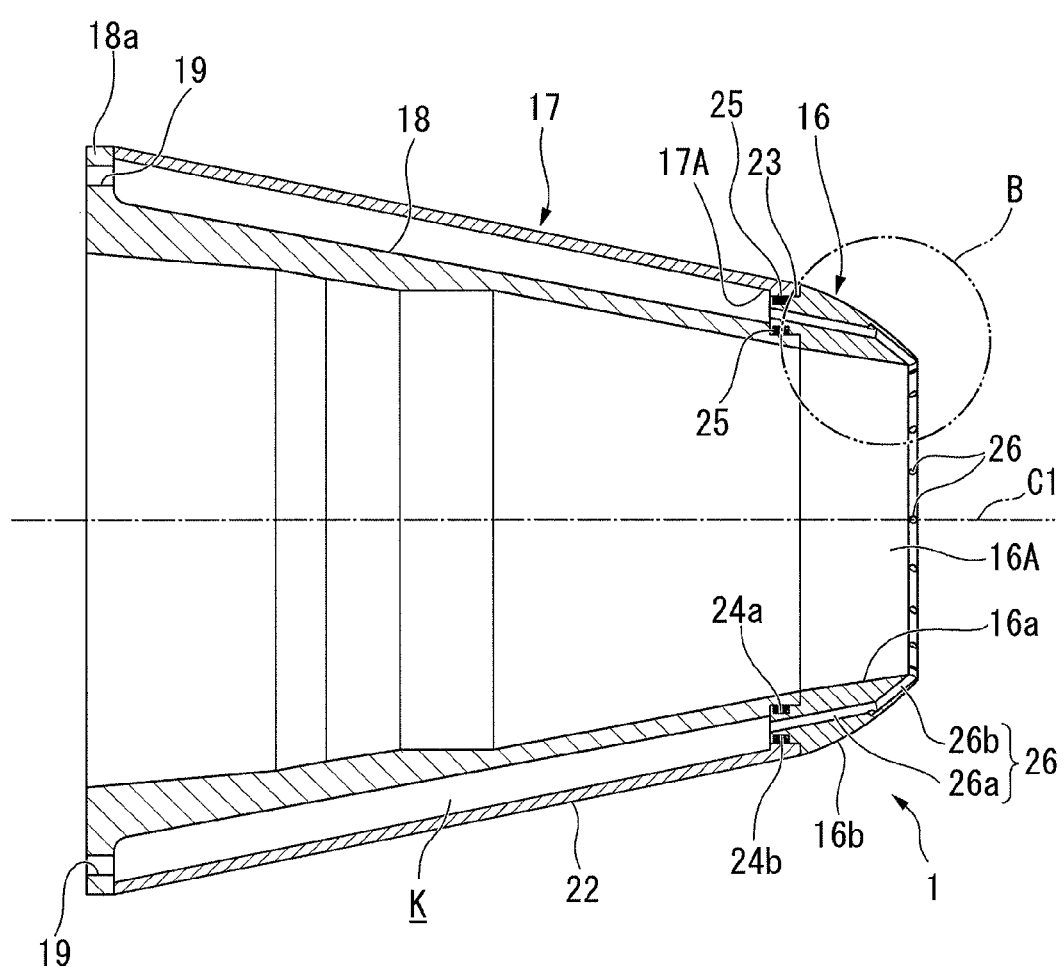
FIG. 3 is a cross-sectional drawing along A-A line of FIG. 2.
Figure 4:
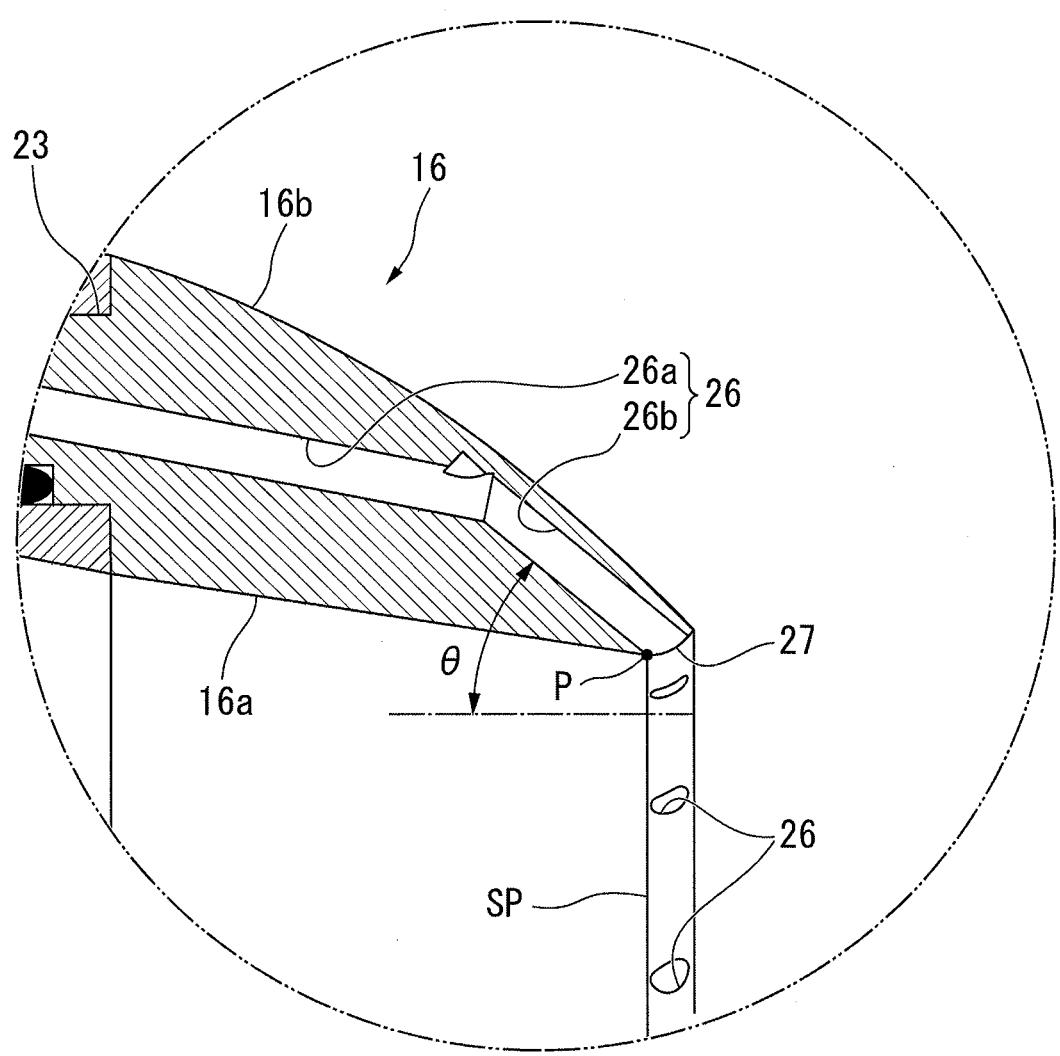
FIG. 4 is an enlarged drawing in B part of FIG. 3.

FIG. 2 is a perspective drawing of the noise reduction system 1. FIG. 3 is a cross-sectional drawing along A-A line of FIG. 2. FIG. 4 is an enlarged drawing in B part of FIG. 3.

As shown in FIGS. 1-4, the noise reduction system 1 includes the microjet ring 16 provided at the exhaust side peripheral edge 3A of the cylindrical partition 3, and a chamber 17 provided at the outer periphery of the cylindrical partition 3 in the upstream side (the left side in FIGS. 1, 2) of the microjet ring 16.

The chamber 17 is formed of stainless steel (e.g., SUS321), inconel alloy or the like, and includes a cylindrical inner peripheral wall 18 configured as a portion of the inner periphery of the cylindrical partition 3.

In other words, the inner peripheral wall 18 is formed as a substantially truncated cone shape when viewed from the side thereof, which is gradually reduced in diameter toward the exhaust side (the downstream side). The inner peripheral wall 18 is configured to be flush with the inner peripheral surface of the cylindrical partition 3.

An outer flange 18a is integrally formed to the upstream side peripheral edge of the inner peripheral wall 18. The outer flange 18a is configured to fix the inner peripheral wall 18 to the cylindrical partition 3, in which a plurality of bolt-holes (not shown) is formed so as to be placed in the circumferential direction thereof at regular intervals. On the other hand, female screws are formed to the cylindrical partition 3 at positions corresponding to the bolt-holes. Bolts (not shown) are threaded into the female screws from the inner peripheral wall 18 side, and thereby the inner peripheral wall 18 can be fastened to the cylindrical partition 3.

A plurality of air inlets 19 is formed to the outer flange 18a at different positions from the bolt-holes (not shown) so as to be placed in the circumferential direction at regular intervals.

The air inlets 19 are connected to the flow path 5 in the upstream side of the combustor 12 via supply paths 20 which are provided in the cylindrical partition 3. One end of the supply path 20 is connected to the air inlet 19 of the outer flange 18a by using a joint (not shown). Accordingly, part of the air A compressed by the fan 11a or the compressor 4 is taken in the chamber 17. In addition, a valve 21 is provided on a portion of the supply path 20.

Further, for example, a TEFLON® tube or the like is used for the supply path 20.

It is possible to improve assembling workability and to reduce a pipe loss, by using the TEFLON® tube.

A cylindrical outer peripheral wall 22 is provided in the outside of the inner peripheral wall 18 so as to cover the inner peripheral wall 18. The outer peripheral wall 22 is formed as a substantial truncated cone shape when viewed from the side thereof, along the extending direction of the inner peripheral wall 18. The outer peripheral wall 22 is configured as a portion of the outer periphery of the cylindrical partition 3. In other words, the outer diameter of the upstream side edge in the outer peripheral surface of the outer peripheral wall 22 is the same as the outer diameter of the downstream side edge in the outer peripheral surface of the cylindrical partition 3 (refer to FIG. 1).

The upstream side peripheral edge of the outer peripheral wall 22 is fixed to the outer flange 18a of the inner peripheral wall 18 by means of machining or welding. Part of the air A compressed by the fan 11a or the compressor 4 is taken in a space K that is surrounded by the outer peripheral wall 22 and the inner peripheral wall 18 which are fixed to each other like this.

The microjet ring 16 is fitted into an opening 17A formed by the inner peripheral wall 18 and the outer peripheral wall 22, and the opening 17A is placed in the downstream side of the chamber 17, that is, the exhaust side of the cylindrical partition 3.

The microjet ring 16 is formed of stainless steel (e.g., SUS321), inconel alloy or the like same as the chamber 17, as a substantial cylindrical shape. The microjet ring 16 is formed so as to taper toward the downstream side.

In other words, an inner peripheral surface 16a of the microjet ring 16 is formed to be flush with the inner peripheral surface of the chamber 17, to be along the inner peripheral surface of the chamber 17, and to be gradually reduced in diameter toward the downstream side. On the other hand, an outer peripheral surface 16b of the microjet ring 16 is formed to gradually curve to the inside in the radial direction thereof toward the downstream side. The outer peripheral surface 16b is configured to be flush with the outer peripheral wall 22 of the chamber 17. Accordingly, the microjet ring 16 is formed to be thick in the base end side thereof, and to be gradually reduced in thickness toward the tip side thereof.

An insertion portion 23 configured in a substantially ring shape when viewed from the axial direction thereof is integrally formed at the base end of the microjet ring 16. The insertion portion 23 is fitted into the opening 17A of the chamber 17. O-ring grooves 24a, 24b are respectively formed in the inner and outer peripheral surfaces of the insertion portion 23. O-ring 25 to improve sealing properties of the connection between the chamber 17 and the microjet ring 16 is installed in each of the O-ring grooves 24a, 24b.

It is preferable that rubber, fluorine series, TEFLON® series or the like, whose heat-resistant temperature is about 400 degrees Celsius, be used for the O-ring 25.

A plurality of injection pipes 26 is formed at the microjet ring 16 in the circumferential direction thereof at regular intervals so as to penetrate the microjet ring 16 in the axial direction. The injection pipe 26 injects the air A taken in the chamber 17 to the jet flow X exhausted from the jet flow outlet 16A. The injection pipe 26 is formed of a first pipe 26a and a second pipe 26b. The first pipe 26a is disposed from the insertion portion 23 to the front side of the center of the microjet ring 16 in the axial direction, and formed along the extending direction of the inner peripheral surface 16a. The second pipe 26b is formed from the end of the first pipe 26a to the tip of the microjet ring 16.

The inclination angle θ of the second pipe 26b is set larger than that of the first pipe 26a. More specifically, the inclination angle θ of the second pipe 26b is set to be 30-45 degrees relative to the central axis C1 (refer to FIG. 4). By setting like this, the air A taken in the chamber 17 can be certainly injected to the jet flow X exhausted from the jet flow outlet 16A, and the inclination of the outer peripheral surface 16b of the microjet ring 16 can be small.

The air A which was injected from each of the injection pipes 26 becomes a microjet and then the microjet is injected to the jet flow X because the plurality of the injection pipes 26 is formed at the microjet ring 16 in the circumferential direction at regular intervals.

As minutely shown in FIG. 4, an arc surface 27 is formed at the tip of the microjet ring 16, as a substantial circular arc shape in sectional view. By forming the arc surface 27, the tip of the microjet ring 16 in the inner peripheral surface 16a side is formed so as to gradually increase in diameter toward the exhaust side (the right side in FIG. 4) from a starting point P of the arc surface 27.

In other words, the inner peripheral surface 16a of the microjet ring 16 is gradually reduced in diameter toward the exhaust side. Accordingly, the starting point P of the arc surface 27 is set to be a throat SP having the smallest diameter.

(Functions)

Functions of the jet engine 100 and the noise reduction system 1 are explained as follows.

As shown in FIG. 1, when an aircraft takes off, at first, the fan 11a is rotated and thereby the air A is taken in from the air inlet 2A. Part of the air A is compressed by the compressor 4, mixed with fuel at the combustor 12, and combusted therein.

In the turbine 13, driving force is generated to drive the fan 11a and the compressor 4 by using combustion gas which was exhausted from the combustor 12. Thereafter, the fan 11a is rotated by the driving force generated by the turbine 13, and thereby the air A is taken in.

According to motions like this, the jet flow X flows through the flow path 5 inside the cylindrical partition 3, and is exhausted from the jet flow outlet 16A. In addition, the bypass flow Y flows through the flow path 6 between the cylindrical partition 3 and the casing 2, and is exhausted from the bypass flow outlet 2B. As a result, thrust is obtained and thus the aircraft takes off.

At this time, the valve 21 is opened, and part of the air A which was compressed by the fan 11a or the compressor 4 is taken in the chamber 17. The air A in the chamber 17 is increased to a predetermined pressure, and then the air A is microjet-injected to the jet flow X, through the injection pipe 26 of the microjet ring 16.

Figure 5:
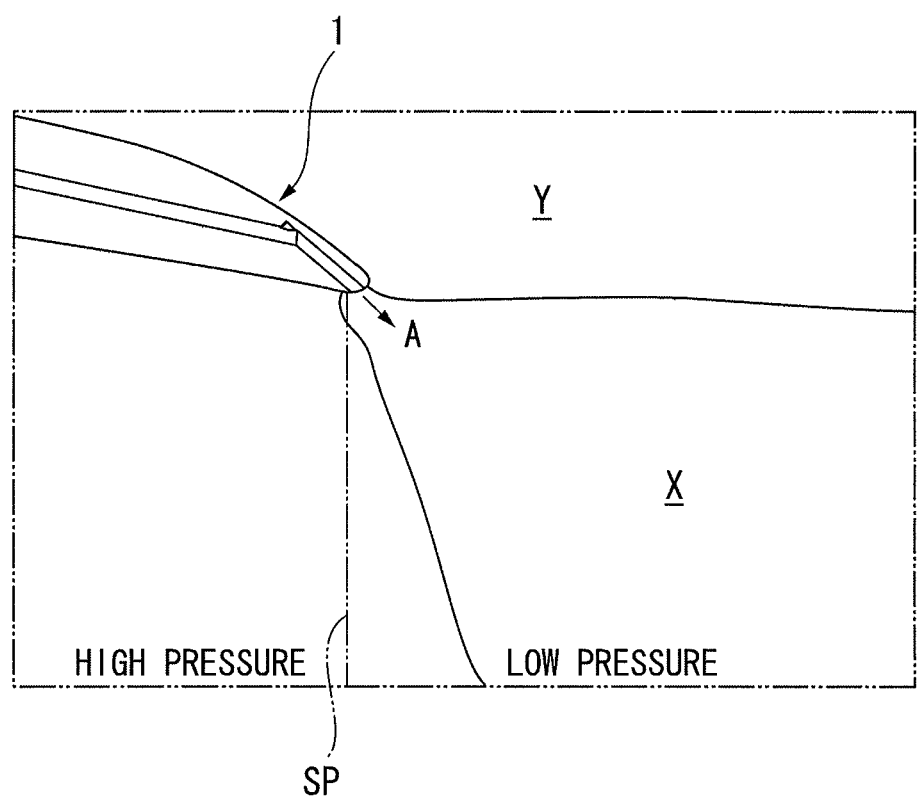
FIG. 5 is an explanation drawing showing a jet flow and a flow of air in the embodiment of the present invention.

FIG. 5 is an explanation drawing showing the jet flow X and the flow of the air A when microjet-injection is performed.

In FIG. 5, with respect to the jet flow X, the area in the upstream side of the throat SP has high pressure. On the other hand, the area in the downstream side of the throat SP has lower pressure than the upstream side. Therefore, the microjet-injection is to be injected to the low pressure area, and thereby a sufficient flow volume can be obtained without excessively increasing the pressure in the chamber 17. The microjet-injection is smoothly performed toward the downstream side from just behind the throat SP, that is, so that an acute angle is formed between the injection direction from the throat SP and the axial direction.

Because the air A in the chamber 17 is increased to a predetermined pressure, a pressure difference between the chamber 17 and the supply path 20 connecting the chamber 17 to the flow path 5 in the upstream side of the combustor 12 can become small. Accordingly, the pressure loss of the air A in the supply path 20 can be reduced, and a path in which a pressure loss occurs can be almost limited to the injection pipe 26 of the microjet ring 16.

In addition, the temperature of each part of the jet engine 100 is increased by driving it, but the thermal expansion of the microjet ring 16 can be kept smaller than a nozzle having a conventional pipe. Accordingly, a change of the diameter of the injection pipe 26 formed at the microjet ring 16 is smaller than a conventional product, and the reduction of the flow volume of the air A injected through the injection pipe 26 can be prevented.

The air A which was microjet-injected comes to the area where the jet flow X and the bypass flow Y which were exhausted are joined to each other, and thus properly mixes both. Accordingly, the noise generated by the confluence of the jet flow X and the bypass flow Y can be reduced.

If the number of the injection pipes 26 that are formed in the microjet ring 16 is set based on the following expressions, the noise can be reduced more efficiently.

Specifically, when the diameter of the injection pipe 26 is described as d, the diameter at the throat SP of the microjet ring 16, that is, the diameter of the injection nozzle of the jet flow X is described as D, the number of the injection pipes 26 is described as n, and a design index is described as σ, the number n of the injection pipes 26 is set so as to satisfy the following expressions.

$$\sigma = d/(\pi D/n) \quad (1)$$

$$0.11 \leq \sigma \leq 0.16 \quad (2)$$

In addition, the design index σ is the ratio of the areas occupied by the injection pipes 26 to the circumference of the jet flow outlet 16A of the microjet ring 16. If the design index σ is set so as to satisfy the expression (2), it is possible to reduce noise efficiently.

(Effects)

According to the embodiment described above, without using a conventional nozzle having pipes, the microjet can be injected to the confluence of the jet flow X and the bypass flow Y by using the plurality of the injection pipes 26 which was formed in the microjet ring 16. Consequently, the rigidity of the portion where the microjet is injected can be more increased than using the nozzle having pipes. The diameter of the injection pipe 26 can be set larger in response to increasing the rigidity, and thereby the pressure loss can be reduced. Therefore, the damage to the microjet ring 16 can be prevented, and the noise can be effectively reduced by efficiently injecting the microjet.

In addition, because the injection pipes 26 are formed in the microjet ring 16, the injection angle of each of the injection pipes 26 is not changed even by the microjet injection thrust. Accordingly, because it is unnecessary to specially reinforce for maintaining the injection angle, the miniaturization of the microjet ring 16 can be achieved. As a result, the miniaturization of the cylindrical partition 3 can be also achieved.

Further, because the microjet ring 16 is used instead of conventional pipes, a cavity flow by the pipes can be prevented and thus the occurrence of additional noise can be suppressed.

The positions of microjet injection outlets are not changed by only forming the plurality of the injection pipes 26 in the microjet ring 16 in the circumferential direction at regular intervals. Accordingly, the occurrence of a separated flow of the microjet-injection can be prevented and noise can be efficiently reduced.

Moreover, the insertion portion 23 is integrally formed at the microjet ring 16, the insertion portion 23 is fitted into the opening 17A of the chamber 17, and only thereby the assembling of the microjet ring 16 can be finished. Accordingly, it is possible to improve the assembling workability of the jet engine 100.

In addition, the microjet ring 16 is formed as a substantial truncated cone shape when viewed from the side thereof, and the arc surface 27 is formed at the tip of the microjet ring 16. Accordingly, the starting point P of the arc surface 27 is set as the throat SP, and the microjet-injection can be performed from the throat SP to the jet flow. Therefore, it is possible to perform the microjet-injection efficiently, and the noise can be more effectively reduced.

Further, the injection pipe 26 formed at the microjet ring 16 is configured of the first pipe 26a and the second pipe 26b, and the inclination angle θ of the second pipe 26b is set so as to be larger than that of the first pipe 26a. Accordingly, the inclination of the outer peripheral surface 16b of the microjet ring 16 can be small, and the nacelle resistance of the jet engine 100 can be reduced. As a result, it is possible to improve the aerodynamic performance of the jet engine 100.

In addition, the chamber 17 communicating the microjet ring 16 to the flow path 5 is provided between the microjet ring 16 and the flow path 5 in the upstream side of the combustor 12. Accordingly, the pressure difference between the chamber 17 and the supply path 20 connecting the chamber 17 to the flow path 5 can be small, the pressure loss of the air A in the supply path 20 can be reduced, and a path in which a pressure loss occurs can be almost limited to the injection pipe 26 of the microjet ring 16. Consequently, the microjet-injection can be efficiently performed in response to the reduction of the pressure loss, and it is possible to reduce noise more effectively.

Figure 6:
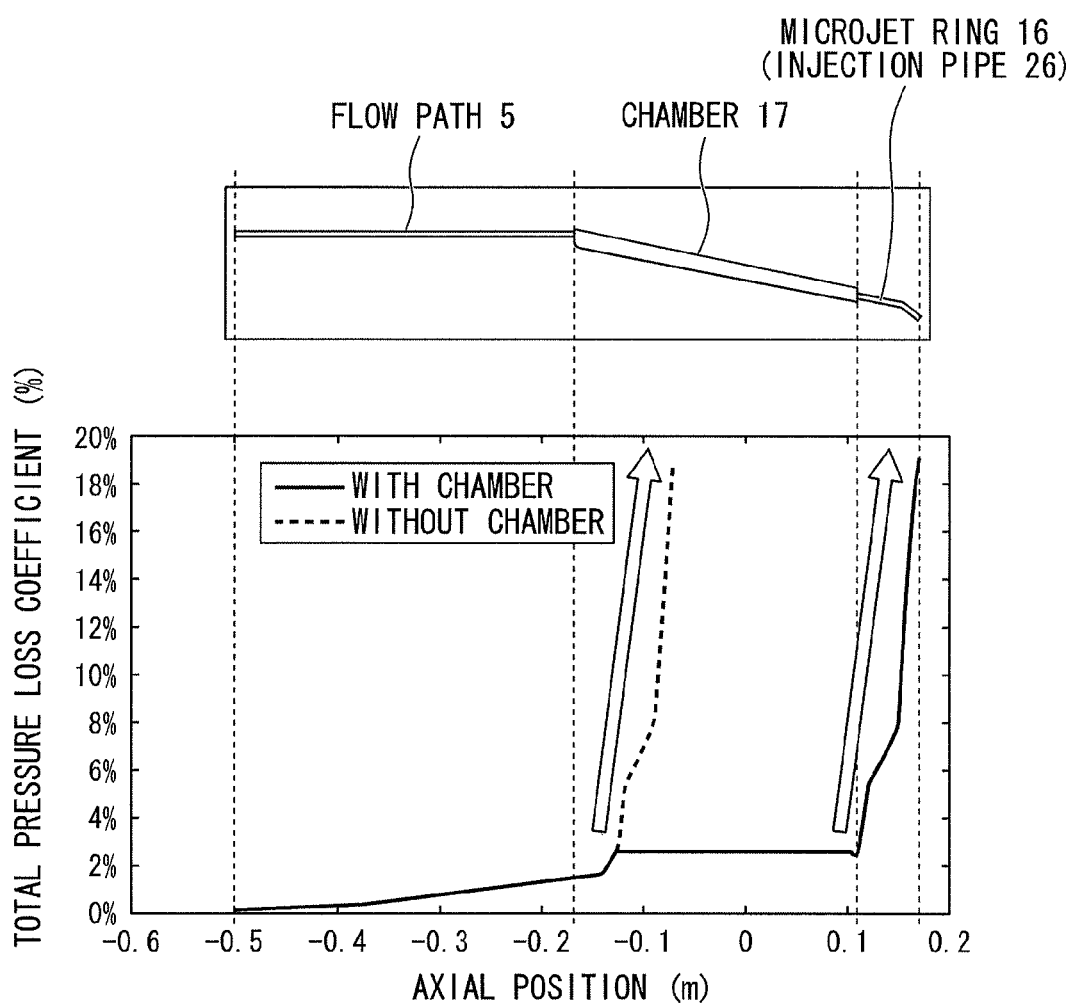
FIG. 6 is a drawing showing a result of verification for a pressure loss reduction effect by a chamber provided in the noise reduction system of the present invention.

With respect to the noise reduction system 1 of the embodiment, FIG. 6 shows a result of verification for a pressure loss reduction effect by providing the chamber 17 communicating the microjet ring 16 to the flow path 5. In the verification result shown in FIG. 6, a part is clipped from the flow path 5 in the upstream side of the combustor 12 through the chamber 17 to the injection pipe 26 of the microjet ring 16, and the total pressure loss coefficient (%) in the axial position thereof is illustrated. In FIG. 6, the horizontal axis shows the axial position, and the vertical axis shows the total pressure loss coefficient (%).

The verification shown in FIG. 6 in which the following conditions were used was conducted by numerical analysis for the total pressure loss coefficient in each axial position thereof.

The inner diameter of the flow path 5: Φ5 mm, 32 pipes

The area of the microjet outlet: the inner diameter of the injection pipeΦ3.15 (mm)×sqrt(32 pipes/20 inlets)= 03.52 mm As shown in FIG. 6, the total pressure loss coefficient is sharply increased at the connecting position between the chamber 17 and the injection pipe 26, that is, the position where the axial position is 0.1 (m). This is thought to be caused by the increase of the total pressure loss because the injection pipe 26 is smaller in cross-section than the chamber 17 having a large cross-section. However, because the injection pipe 26 is small in cross-section, even if the total pressure loss is sharply increased as shown in FIG. 6, the increase of the total pressure loss at the outlet of the injection pipe 26 is maintained from about 10% to about 20%.

If the chamber 17 is not installed as shown by using a broken line in FIG. 6, the total pressure loss is sharply increased from the position where the axial position is 0.18 (m) as the connecting position between the flow path 5 and the chamber 17, in the same manner as the increase of the total pressure loss at the position where the axial position is 0.1 (m) shown in FIG. 6. When the total pressure loss is increased from the position where the axial position is 0.18 (m) in the same manner as the position where the axial position is 0.1 (m), it is evident that the total pressure loss at the outlet of the injection pipe 26 will be more than 50(%).

As is evident from the result shown in FIG. 6, the chamber 17 is an essential component to practically perform the microjet-injection in an engine for an aircraft. This reason is that the total pressure loss can be suppressed in response to the chamber cubic content by installing the chamber 17.

In the noise reduction system in the embodiment, by installing the chamber 17, the effects are obtained that the loss of an extraction pressure from the engine, the extraction pressure to inject the microjet, is greatly reduced, and thus a large extraction from the compressor is unnecessary.

Further, it is unnecessary that a pipe to take the air A in the microjet ring 16 is installed in the portion corresponding to the chamber 17. In other words, the whole outer peripheral surface of the cylindrical partition 3 can be smoothly formed. Accordingly, a cavity flow of a fluid (the air A) which flows on the chamber 17 can be prevented, and nacelle resistance of the jet engine 100 can be further reduced. Therefore, it is possible to suppress the fluid noise when the bypass flow Y flows on an outer peripheral surface of the cylindrical partition 3.

In addition, the present invention is not limited to the above embodiment, and includes the above embodiment with various modifications insofar as they do not depart from the scope of the present invention.

For example, in the above embodiment, a structure is explained in which the insertion portion 23 is integrally formed at the base end of the microjet ring 16, the O-ring 25 is attached to each of the inner and outer peripheral surfaces of the insertion portion 23, and the insertion portion 23 is fitted into the opening 17A of the chamber 17. However, the present invention is not limited to this structure, and the microjet ring 16 may be connected to the chamber 17 by using the structure shown in FIG. 7.

Figure 7:
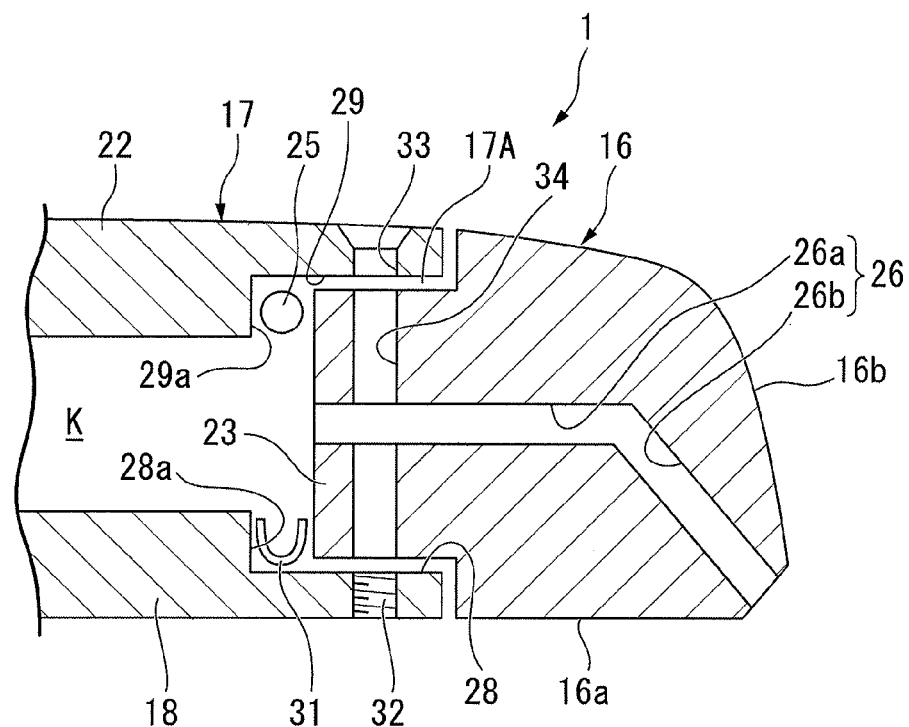
FIG. 7 is a schematic cross-sectional drawing showing another embodiment of a noise reduction system of the present invention.

FIG. 7 is a schematic cross-sectional drawing showing another embodiment of the noise reduction system 1. In addition, in the following description, the same parts as those in the above embodiment are denoted by the same reference signs, and descriptions thereof are omitted.

As shown in FIG. 7, stepped surfaces 28, 29 are respectively formed at the inner peripheral wall 18 and the outer peripheral wall 22 of the chamber 17 as a thin-walled shape, by using each of steps in the opening 17A side. On the other hand, the insertion portion 23 integrally formed in the microjet ring 16 is configured so as to correspond to the stepped surfaces 28, 29, and it is possible to fit the insertion portion 23 to the stepped surfaces 28, 29.

In addition, a female screw 32 is formed at the stepped surface 28 of the inner peripheral wall 18 along the thickness direction thereof. On the other hand, bolt-holes 33, 34 are respectively formed at the stepped surface 29 of the outer peripheral wall 22 and the insertion portion 23 so as to penetrate them and to correspond to the female screw 32. A bolt (not shown) is inserted into the bolt-holes 33, 34, the bolt is threaded into the female screw 32 of the inner peripheral wall 18, and thereby the microjet ring 16 can be connected to the chamber 17.

Further, O-ring grooves 24a, 24b are not formed on the inner and outer peripheral surfaces of the insertion portion 23. A metallic seal 31 is attached between the insertion portion 23 and a step 28a of the inner peripheral wall 18. On the other hand, the O-ring 25 is attached between the insertion portion 23 and a step 29a of the outer peripheral wall 22. Sealing properties at the connecting portion of the chamber 17 and the microjet ring 16 can be improved by using the seal 31 and the O-ring 25.

In addition, it is possible to set the heat-resistant temperature of the seal 31 to about 800 degrees Celsius by using a metallic seal formed of heat-resistant alloy as the seal 31. It is possible to use C-ring, E-ring, U-ring or the like for the seal 31.

In addition, in the above embodiment, the structure is explained in which the microjet ring 16 and the chamber 17 are configured to be separated from each other. However, the present invention is not limited to this structure, and the microjet ring 16 may be integrally formed at the inner peripheral wall 18 of the chamber 17 as shown in FIG. 8.

Figure 8:
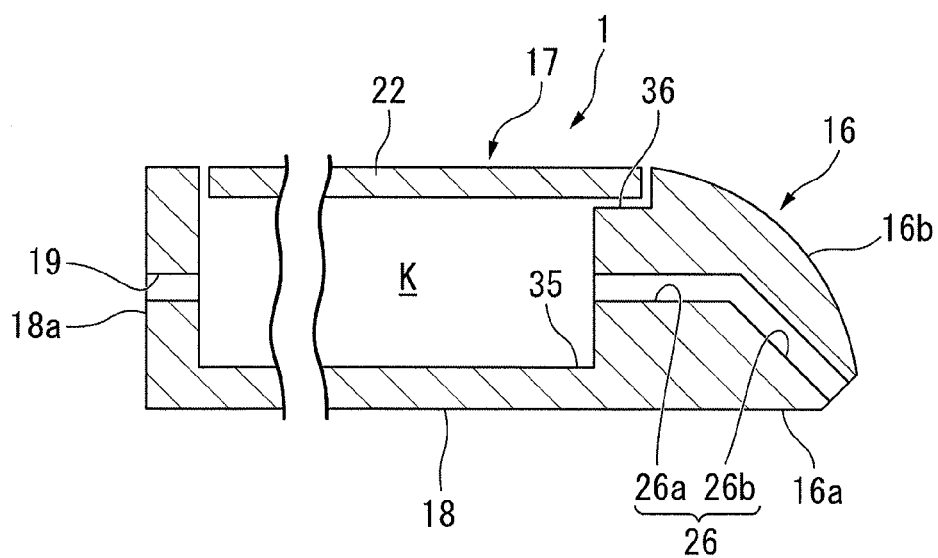
FIG. 8 is a schematic cross-sectional drawing showing another embodiment of a noise reduction system of the present invention.

FIG. 8 is a schematic cross-sectional drawing showing another embodiment of the noise reduction system 1.

As shown in FIG. 8, the inner peripheral surface 16a side of the microjet ring 16 is integrally formed at the end in the downstream side (the right end in FIG. 8) of the inner peripheral wall 18 of the chamber 17. Accordingly, a depressed portion 35 is formed by the microjet ring 16, the inner peripheral wall 18 of the chamber 17, and the outer flange 18a, and is disposed in the whole periphery. The depressed portion 35 is closed by the outer peripheral wall 22 of the chamber 17.

A depressed portion 36 is formed at the outer peripheral surface 16b of the microjet ring 16, in the whole periphery, so as to correspond to the edge of the outer peripheral wall 22. It is possible for the depressed portion 36 to receive the edge of the outer peripheral wall 22. The outer peripheral surface 16b of the microjet ring 16 is fixed to the edge of the outer peripheral wall 22 by using welding and the like, and the outer peripheral wall 22 is fixed to the outer flange 18a of the inner peripheral wall 18 by using welding and the like.

Accordingly, sealing properties can be secured at the connecting portion of the microjet ring 16 and the chamber 17.

In addition, in the above embodiment, the structure is explained in which the chamber 17 is provided between the flow path 5 in the upstream side of the combustor 12 and the microjet ring 16. However, the present invention is not limited to this structure, and one end of the supply path 20 instead of the chamber 17 may be extended and disposed to the microjet ring 16. In this case, the one end of the supply path 20 is connected to the microjet ring 16 by using a joint or the like.

Further, in the above embodiment, the structure is explained in which the microjet ring 16 is formed as a substantial circle shape. However, the present invention is not limited to this structure, and the microjet ring 16 may be configured to be separated in the circumferential direction.

In this case, a seal or the like is attached to the matching surface of each ring piece to another ring piece formed by separating the microjet ring 16, and thereby air tightness is secured. In addition, the injection pipe 26 may be formed in each ring piece. A groove is formed on the matching surface of each ring piece, the groove is placed to overlap another groove, and thereby the injection pipe 26 may be formed.

INDUSTRIAL APPLICABILITY

A noise reduction system of the present invention can prevent damage to a nozzle and efficiently reduce noise.

In addition, according to a noise reduction system of the present invention, assembling workability can be improved, and it is possible to obtain noise reduction effect reliably.

DESCRIPTION OF THE REFERENCE NUMERALS

1 Noise reduction system
2 Casing
3 Cylindrical partition (main nozzle)
3A Exhaust side peripheral edge
4 Compressor
5 Flow path
12 Combustor
16 Microjet ring
16A Jet flow outlet
17 Chamber
20 Supply path
26 Injection pipe
26a First pipe
26b Second pipe
27 arc surface
100 Jet engine
A Air
X Jet flow

What is claimed is:

1. A noise reduction system comprising:
a microjet ring provided at an exhaust side peripheral edge of a main nozzle of a jet engine, and has a plurality of injection pipes formed in a circumferential direction thereof at regular intervals; and
a supply path configured to take part of compressed air in from a flow path in an upstream side of a combustor in the jet engine, and to guide the part of compressed air to the plurality of injection pipes, wherein
the plurality of injection pipes is configured to inject the part of compressed air to a jet flow exhausted from the main nozzle,
the microjet ring is formed so as to be gradually reduced in diameter from an upstream side toward a downstream side of the jet flow,
an arc surface is formed at a tip, in the downstream side of the jet flow, of the microjet ring so that the arc surface connects an inner peripheral surface and an outer peripheral surface of the microjet ring,
the whole of the arc surface increases in diameter from the upstream side toward the downstream side of the jet flow,
a point where the arc surface intersects the inner peripheral surface of the microjet ring is located where a diameter of the inner peripheral surface of the microjet ring is a minimum,
a surface of each of the plurality of injection pipes intersects the arc surface at the point where the arc surface intersects the inner peripheral surface of the microjet ring, and
openings of the plurality of injection pipes are provided in the arc surface.

2. The noise reduction system according to claim 1, wherein
at least a vicinity of an injection outlet side in the plurality of injection pipes is formed toward the downstream side of the jet flow so that an acute angle is formed between the vicinity and an axial direction of the main nozzle.

3. The noise reduction system according to claim 1, wherein
a chamber is provided between the microjet ring and the flow path, and configured to communicate the microjet ring to the flow path.

* * * * *